United States Patent

[11] 3,550,917

| [72] | Inventor | Linden Wayne Cochran<br>Basking Ridge, N.J. |
|---|---|---|
| [21] | Appl. No. | 788,286 |
| [22] | Filed | Dec. 31, 1968 |
| [45] | Patented | Dec. 29, 1970 |
| [73] | Assignee | Multi-Minerals Limited<br>Toronto, Ontario, Canada |

[54] GAS SPARGING MECHANISM
5 Claims, 3 Drawing Figs.

[52] U.S. Cl. .................................................. 261/121,
248/287
[51] Int. Cl. ..................................................... B01f 3/04
[50] Field of Search........................................... 261/S.D.,
121; 248/287

[56] References Cited
UNITED STATES PATENTS
996,430  6/1911  Schrier.......................... 248/287

| 1,313,061 | 8/1919 | Brown.......................... | 248/287X |
| 1,708,179 | 4/1929 | Hurt............................. | 261/121 |
| 2,389,488 | 12/1945 | Dailey, Jr. .................... | 261/121 |
| 2,760,765 | 8/1956 | Roop............................ | 261/121 |
| 3,116,347 | 12/1963 | Allen............................ | 261/121X |
| 3,130,248 | 4/1964 | Winston....................... | 261/121 |
| 3,174,733 | 3/1965 | Chase........................... | (261/S.D.) |

*Primary Examiner*—Tim R. Miles
*Attorney*—Norman N. Holland

ABSTRACT: An improved gas sparging mechanism for use in a tank reactor. Such an apparatus is used to aid in the removal of volatile contaminants from the reaction medium in a reactor by the introduction of gas sparging current and is capable of both vertical and lateral adjustment in order to permit the direction of the sparging current to be directed to various parts of the reactor to enable efficient volatilization of contaminants.

INVENTOR.
LINDEN WAYNE COCHRAN
BY
ATTORNEY

GAS SPARGING MECHANISM

Description

The present invention relates to an improved gas sparging mechanism which may be used in tank reactors to aid in the removal of volatile contaminants from the reaction medium. For example, in reacting acid with phosphate rock in the production of phosphoric acid, fluorine contaminants may be removed as volatile compounds, such as hydrogen fluoride gas. Introduction of gas sparging currents into the liquor materially aids the volatilization of contaminants from the digestion medium which is at elevated temperatures. The gas that is used is preferably a moist heated current of air, although other gases, such as the inert gases, may also be used if desired.

In conventional reactors, the air sparging mechanism is capable of vertical adjustment only. It has been found that with such a mechanism the sparging air does not reach all the liquor in the tank so that not all of the fluorine contaminants are removed.

The present invention eliminates this and provides an improved air sparging mechanism for tank reactors which is more efficient.

Another object of the present invention is to provide an improved gas sparging mechanism which will be able to distribute the gas throughout the reactor.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification wherein.

Figure 1:
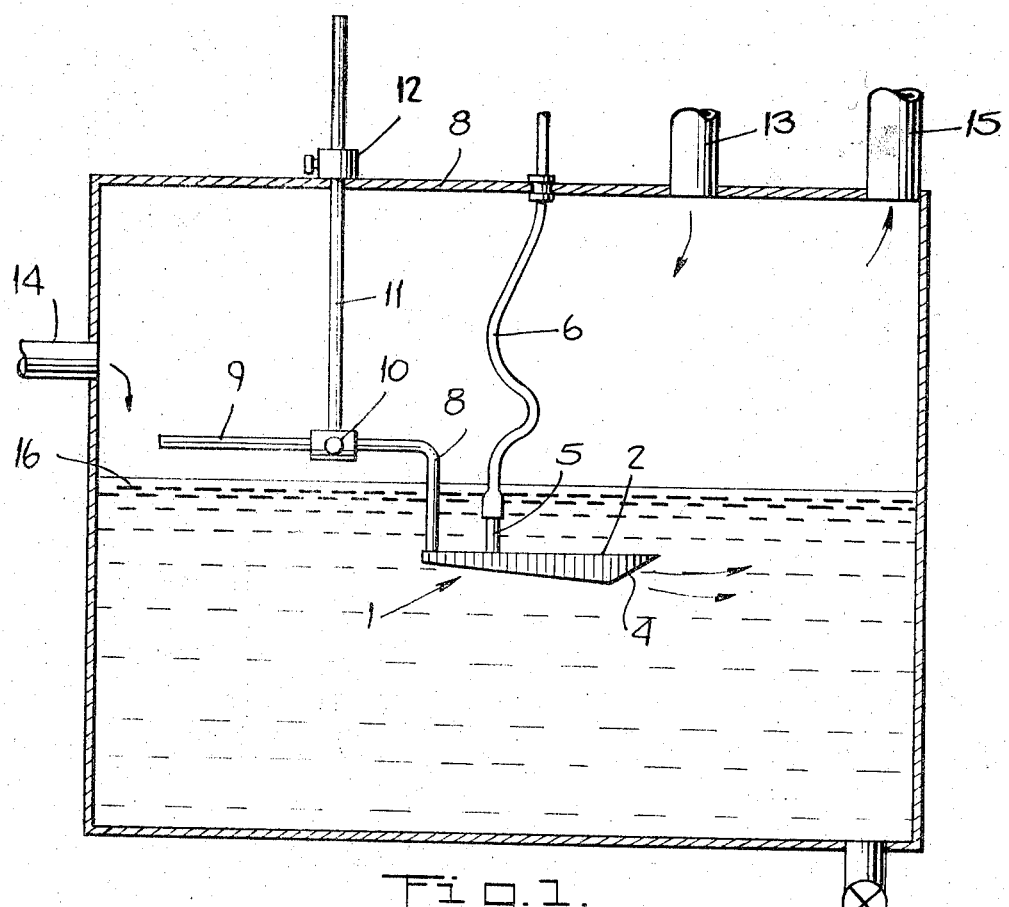
FIG. 1 is a sectional view of a tank showing the air sparging shoe of of the present invention.
Figures 2, 3:
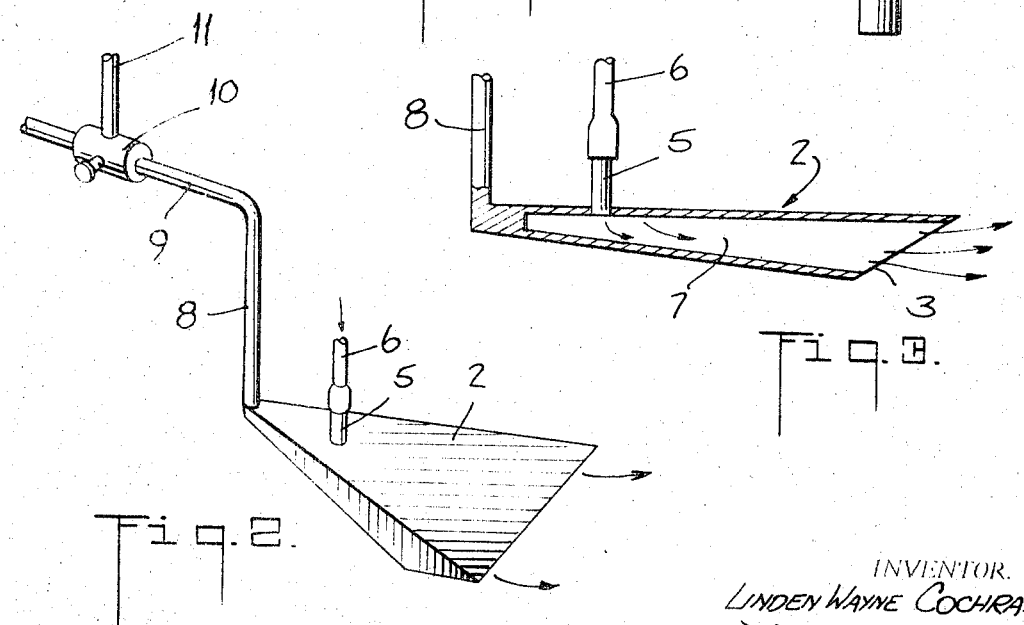
FIG. 2 is a perspective view of the sparger shoe.
FIG. 3 is a sectional view of the sparger shoe showing the air chamber and outlet.

As shown in the drawings the sparging shoe 1 that is mounted within a tank reactor 17 comprises a gas sparging shoe member 2 which has an air chamber 7 and an air outlet 3 at its end 4. An upstanding gas supply pipe member 5 extends therefrom and is connected to a hose 6 which leads to a suitable gas supply system (not shown). In the drawings, the outlet 3 is preferably one large aperture, however, it will be understood that a series of smaller outlets may be used, if desired.

The shoe member 2 is mounted on an arm 8 which has a lateral portion 9 that passes through an adjustable clamp 10. This clamp 10 is mounted at the lower end of a rod 11 which passes through the upper wall 8 of the tank 17. In the preferred embodiment, the rod 11 is mounted for vertical or rotational adjustment on clamp 12. With the horizontal adjustment clamp 10 controlling horizontal and rotational adjustment of shoe 2 and the clamp 12 controlling vertical adjustment, it will be seen that the shoe 2 can be moved to any position within the tank 17.

In practicing the invention, a reaction medium, such as apatite is introduced with the reactor tank 17 through inlet 13 and a digesting reactant, such as phosphoric acid, is introduced into tank 17 through inlet 14. Gaseous wastes are removed at outlet 15 and the desired end products are recovered at 18.

Vertical and lateral adjustments to the sparging shoe 2 may be made by means of the two clamps 10 and 12. Adjustment of clamps 10 or 12 enables the operator to raise or lower rod 11, thus changing the vertical position of shoe 2 in tank 17. Adjustment of clamp 10 allows rod member 9 and shoe 2 to be moved forwardly and rearwardly. Rotational lateral adjustment can be made by means of clamp 12.

It will thus be seen that clamps 10 and 12 allow the operator to adjust the position of the sparger shoe in tank 17 to any desired position. This insures that the sparging current is expelled into the reactor tank at the point where it is the most advantageous and also insures that the position of the current can be thereafter adjusted to any other desired point should conditions warrant.

As changes may be made in the construction and arrangement of the parts herein without departing from the spirit and scope of the invention and without sacrificing any of its advantages, it is to be understood that all matter herein is to be interpreted as illustrative and not in a limiting sense.

I claim:

1. A gas sparging mechanism for introducing a stream of gas into a reaction tank comprising a shoe member, hose means for supplying gas to the shoe member, said shoe member having outlet means through which gas is expelled, said shoe member being mounted on a first support member which passes through a first adjustable clamp, said first clamp being attached to a second vertical support member which is perpendicular to the first support member and which passes through a second adjustable clamp, said second adjustable clamp being fixedly mounted on said reaction tank, whereby adjustment of the position of the support members in said clamps allows adjustment of both the lateral and vertical position of the shoe member in the reaction tank.

2. A mechanism as claimed in claim 1 wherein both of said support members comprise rods.

3. A mechanism as claimed in claim 1 in which the second adjustable clamp is fixedly mounted on the cover of the reaction tank.

4. A mechanism as claimed in claim 1 in which the support members comprise rods, the rod holding the shoe member passes through the first adjustable clamp at right angles to the second rod, and said second adjustable clamp is fixedly mounted on the cover of the reaction vessel.

5. A mechanism as claimed in claim 4 in which the shoe member has a pipe fixedly attached to it for insertion into a hose which introduces the gas.